United States Patent [19]

Iwata et al.

[11] Patent Number: 4,786,675
[45] Date of Patent: Nov. 22, 1988

[54] SEALED SEMICONDUCTOR CONTAINING AN EPOXY RESIN COMPOSITION

[75] Inventors: Riso Iwata, Tokyo; Yoichiro Kubo, Yokohama, both of Japan

[73] Assignee: Nippon Zeon Co., Ltd., Tokyo, Japan

[21] Appl. No.: 45,770

[22] Filed: Apr. 29, 1987

Related U.S. Application Data

[62] Division of Ser. No. 809,716, Dec. 17, 1985, abandoned.

[30] Foreign Application Priority Data

Dec. 21, 1984 [JP] Japan .............................. 59-270322
Feb. 15, 1985 [JP] Japan ................................ 60-27605

[51] Int. Cl.$^4$ ...................... C08K 03/34; C08K 03/26; C08L 63/02; C08L 63/04
[52] U.S. Cl. .................... 523/456; 525/109; 525/111; 525/113; 525/119; 525/122
[58] Field of Search ............... 525/119, 109, 111, 113, 525/122; 523/456

[56] References Cited

U.S. PATENT DOCUMENTS

| | | | |
|---|---|---|---|
| 4,073,776 | 2/1978 | Galkiewicz et al. | 525/507 |
| 4,073,826 | 2/1978 | Galkiewicz et al. | 525/92 |
| 4,119,616 | 10/1978 | O'Farrell et al. | 525/344 |
| 4,251,415 | 2/1981 | Nakada et al. | 525/119 |
| 4,259,403 | 3/1981 | Tomlinson | 525/344 |
| 4,460,746 | 7/1984 | Fock et al. | 525/119 |
| 4,476,285 | 10/1984 | Fock et al. | 525/119 |
| 4,480,009 | 10/1984 | Berger | 528/23 |
| 4,503,174 | 3/1985 | Vasta | 525/119 |
| 4,588,778 | 5/1986 | Nir et al. | 525/119 |
| 4,617,353 | 10/1986 | Myers | 525/279 |
| 4,632,960 | 12/1986 | Sato et al. | 525/118 |

FOREIGN PATENT DOCUMENTS

| | | | |
|---|---|---|---|
| 0249475 | 5/1960 | Australia | 525/119 |
| 0809658 | 2/1959 | United Kingdom | 525/119 |

*Primary Examiner*—John C. Bleutge
*Assistant Examiner*—Robert E. L. Sellers, II
*Attorney, Agent, or Firm*—Sherman and Shalloway

[57] ABSTRACT

For use in sealing semiconductors, an epoxy resin composition is provided which comprises an epoxy resin, a curing agent, a filler and a modifier, wherein the modifier is a diene polymer or acrylic polymer having an iodine number of not more than 120 or both included in an amount of 1 to 50 parts by weight per 100 parts by weight of the epoxy resin.

5 Claims, No Drawings

SEALED SEMICONDUCTOR CONTAINING AN EPOXY RESIN COMPOSITION

This application is a division of application Ser. No. 809,716, filed Dec. 17, 1985, now abandoned.

This invention relates to a semiconductor sealing epoxy resin composition having improved heat resistance, cracking resistance and moisture resistance comprising a diene polymer or acrylic polymer having an iodine number of not more than 120 or both as a modifier.

Electronic circuit parts such as semiconductor elements, capacitors and coils were conventionally sealed by a hermetic method using ceramic materials. In recent years, this method has largely been superseded by a method using silicone-type or epoxy-type thermosetting resins. Among such resins, epoxy resins are used in by far the greatest quantities.

Semiconductor devices sealed by the epoxy resins have the defect of being slightly inferior in reliability (heat-resistant impact strength, moisture resistance, high-temperature operating characteristics, etc.) to those sealed by the conventional hermetic method.

With the rapid technological advance in the electronics industry in recent years, semiconductor elements themselves have tended to be of higher density and larger in size than before. Furthermore, the package structure of molded articles has tended to be thinner and smaller in size. With these tendencies, epoxy resin materials for sealing semiconductors have been required to have high reliability in order to retain the characteristics of the semiconductors. Particularly, there is a great need for the strength, moisture resistance and heat resistance of the molded articles.

When such semiconductor elements of higher density and larger sizes are formed into a small-sized thin package structure by using the conventional epoxy resin materials, some elements or molded articles undergo cracking after molding. Some others undergo cracking and corrosion in aluminum wirings or increase in leaked currents in reliability tests (such as a heat-resistant impact strength test, a moisture resistance test, a high-temperature operating test, etc.) conducted after the molding.

In order to remedy the defects of such conventional epoxy resin materials, there have been proposed a method comprising modifying the epoxy resins with a silane coupling agent having not more than 2 functional groups and a silicone oil or silicone rubber (Japanese Laid-Open Patent Publication No. 34824/1983), a method comprising modifying the epoxy resins with a polyester elastomer (Japanese Laid-Open Patent Publication No. 184204/1983), and a method comprising modifying the epoxy resins with fine synthetic rubber particles and an organopolysiloxane (Japanese Laid-Open Patent Publication No. 94442/1984). According to these methods, the cracking resistance can be improved, but other problems arise. For example, the heat resistance is reduced (for example, the leak current increases) or the moisture resistance is decreased (for example, defects due to the corrosion of aluminum wirings increase). The epoxy resin materials modified with these materials are not satisfactorily improved.

Furthermore, in recent years, there has been a problem of cracking in elements and molded articles having a thin package structure. This problem has to do with the moisture absorption of the package and an increase in internal stress. But no satisfactory solution has heretofore been given to this problem.

It is an object of this invention to provide a semiconductor sealing epoxy resin composition having improved cracking resistance while retaining the good heat resistance and moisture resistance of the epoxy resin.

The present inventors, after extensive works, have now found that the above object can be achieved by using a particular polymer as a modifier for a semiconductor sealing epoxy resin and thereby reducing the stress of the epoxy resin.

Thus, according to this invention, there is provided an epoxy resin composition for sealing semiconductors comprising an epoxy resin, a curing agent, a filler and a modifier, wherein the modifier is a diene polymer and/or acrylic polymer each having an iodine number of not more than 120 included in an amount of 1 to 50 parts by weight per 100 parts by weight of the epoxy resin.

The iodine number (measured in accordance with JIS K0070) of the modifier used in this invention should be not more than 120, preferably 0 to 100, more preferably 0 to 85, in order to improve the heat resistance of a sealed article to be obtained.

The diene polymer used in this invention is a hydrogenated product of a polymer prepared from at least one conjugated diene monomer such as 1,3-butadiene, 2,3-dimethylbutadiene, isoprene and 1,3-pentadiene, or a copolymer prepared from at least one conjugated diene monomer exemplified above and at least one monomer copolymerizable with it or a hydrogenation product of the copolymer. Examples of the copolymerizable monomer include unsaturated nitriles such as acrylonitrile and methacrylonitrile; aromatic vinyl compounds such as styrene and alpha-methylstyrene, unsaturated carboxylic acids and salts thereof, such as acrylic acid, methacrylic acid, itaconic acid and maleic acid; carboxylic acid esters such as methyl acrylate, 2-ethylhexyl acrylate and methyl methacrylate; alkoxyalkyl esters of unsaturated carboxylic acids such as methoxyethyl acrylate, ethoxyethyl acrylate and methoxyethoxyethyl acrylate; N-substituted (meth)acrylamides such as acrylamide, methacrylamide, N-methylol (meth)acrylamide, N,N'-dimethylol (meth)acrylamide and N-ethoxymethyl (meth)acrylamide; and epoxy group-containing monomers such as allyl glycidyl ether, glycidyl acrylate and glycidyl methacrylate.

The acrylic polymer used in this invention is a polymer prepared from at least one acrylic acid ester such as methyl acrylate, ethyl acrylate, butyl acrylate, 2-ethylhexyl acrylate, methoxymethyl acrylate, ethoxyethyl acrylate, cyanoethyl acrylate and cyanobutyl acrylate, or a copolymer prepared from at least one such acrylic acid ester and at least one monomer copolymerizable with it. Examples of the monomer copolymerizable with the acrylic acid ester include ethylenically unsaturated monomers such as acrylic acid, monomethyl maleate, maleic acid, methacrylic acid, vinyl glycidyl ether, allyl glycidyl ether, methallyl glycidyl ether, glycidyl acrylate, glycidyl methacrylate, vinyl acetate, ethylene and propylene.

Specific examples of the polymers used in this invention include polymers obtained by hydrogenating the conjugated diene unit portion of polybutadiene (BR), polyisoprene, styrene/butadiene random copolymer (BR), styrene/butadiene block copolymer, styrene/isoprene copolymers (random and block), butadiene/acrylonitrile copolymer (NBR), isoprene/butadiene/a- crylonitrile copolymer, isoprene/acrylonitrile copolymer and butadiene/ethylene copolymer; butadiene/methyl acrylate/acrylonitrile copolymer, butadiene/ethylene/acrylonitrile copolymer and butadiene/acrylic acid/acrylonitrile copolymer, and hydrogenation products of these; and butyl acrylate/ethoxyethyl acrylate/vinyl chloroacetate/acrylonitrile copolymer, butyl acrylate/ethoxyethyl acrylate/vinyl norbornene/acrylonitrile copolymer, butyl acrylate/ethyl acrylate/glycidyl ether copolymer, ethyl acrylate/butyl acrylate/acrylic acid copolymer, ethylene/methyl acrylate copolymer, ethylene/methyl acrylate/monomethyl maleate copolymer, and ethylene/methyl acrylate/vinyl acetate copolymer. These polymers can be obtained by ordinary polymerization techniques and ordinary hydrogenation methods. Needless to say, the methods of producing these polymers are not limited in particular.

The polymers used in this invention, may be a liquid polymer, a high-molecular-weight rubbery polymer, or a mixture of both. When it is desired to improve the solder-resistant impact strength of a sealed article particularly by using the liquid polymer, its viscosity at 25° C. is preferably 2000 to one million cps.

The amount of the modifier polymer used is 1 to 50 parts by weight per 100 parts by weight of the epoxy resin. If it is less than 1 part by weight, the cracking resistance cannot be improved. If it exceeds 50 parts by weight, the flowability, moisture resistance and solder-resistant impact strength of the sealed article are deteriorated. The preferred amount of the modifying polymer is 15 to 30 parts by weight.

When the liquid polymer is used in this invention, the use of a high-molecular-weight synthetic rubber powder in combination with the polymer gives a better improving effect. There is no particular limitation on the synthetic rubber powder. Powders of diene-type rubber polymers having an iodine number of not mofe than 120 and acrylic rubbers and silicone rubbers having an iodine number of not more than 120 are preferred.

There is no particular limitation on the epoxy resin used in this invention, and a wide range of known epoxY compounds can be used. Examples include glycidyl-type (or methyl glycidyl-type) epoxy resins, for example glycidyl ethers of phenols such as bisphenol A, bisphenol A, resorcinol, phenol novolaks and cresol novolaks, glycidyl ethers of alcohols such as butanediol, polyethylene glycol and polypropylene glycol, and compounds obtained by substituting the glycidyl group for active hydrogen bonded to the nitrogen atom of nitrogencontaining compounds such as aniline and isocyanuric acid; and alicyclic epoxides obtained by epoxidizing an intramolecular olefin linkage with a peroxy acid, etc., such as vinyl cyclohexene diepoxide, 3,4-epoxycyclohexylmethyl-3,4-epoxycyclohexanecarboxylate, and 2-(3,4-epoxy) cyclohexyl-5,5-spiro(3,4-epoxy)cyclohexane-m-dioxane.

The curing agent used in the composition of this invention may be any of known epoxy resin curing agents. Examples include "acid anhydride curing agents" such as maleic anhydride, phthalic anhydride, tetrahydrophthalic anhydride, hexahydrophthalic anhydride, endomethylenetetrahydrophthalic anhydride, methylendomethylenetetrahydrophthalic anhydride, methyltetrahydrophthalic anhydride, tetrachlorophthalic anhydride, endodicychloromethylenetetrachlorophthalic anhydride, tetrabromophthalic anhydride, trimellitic anhydride, cyclopentanetetracarboxylic dianhydride, benzophenonetetracarboxylic dianhydride and pyromellitic dianhydride; aromatic amines such as diaminodiphenylmethane, diaminodiphenylether, diaminodiphenylsulfone, benzidine, dianisidine, phenylenediamine, methylenebis(o-chloroaniline), 3,3'-dicarboxybenzidine and 3,3'-dicarboxydiaminodiphenylmethane; and "phenolic curing agents" having a polyhydric phenolic hydroxyl groups such as a condensate of phenol or cresol with p-xylylene dimethoxide, and a condensate between phenol or cresol with diphenyl ether or formaldehyde. Other examples include isocyanates which react with epoxy resins to form an oxazolidone ring and by themselves trimerize to trimers, such as tolylene diisocyanate, diphenylmethane diisocyanate, hydrogenated diphenylmethane diisocyanate, hexane-1,6-diisocyanate, naphthalene diisocyanate, polymethylene polyphenylene polyisocyanate and dimers or trimers of the above isocyanates. Maleimides synthesized from amines such as diaminodiphenylmethane and polymethylene polyphenylene polyamine and maleic anhydride polymerize by themselves and the epoxy resin reacts with amide acid remaining in their molecules and is cured. These compounds can be used as curing agents for epoxy resins. Adducts of the maleimides and polyamines can also be used as curing agents for epoxy resins.

Any known curing accelerators for epoxy resins can be used. For example, when the curing agent is a phenolic curing agent, there may be used aliphatic or aromatic secondary or tertiary amines and nitrogen-containing heterocyclic compounds such as imidazolines and imidazoles as the curing accelerator. It is preferred to use tetra-substituted phosphonium tetrasubstituted borates, tetra-substituted arsonium tetrasubstituted borates, tetra-substituted ammonium tetrasubstituted borates, tetrasubstituted ammonium tetrasubstituted borates, borates of various imidazole compounds and the reaction product of dimethylaminoethanol and an acid anhydride. They may be used in combination.

A filler, particularly an inorganic filler, is used to produce semiconductor sealed articles such as transistors, IC, and LSI by transfer molding. Examples of the inorganic filler are calcium carbonate, silica powder, zirconium silicate, calcium silicate, quartz glass powder, talc, clay, mica, and glass fiber powders. As required, they may be used in combination. Other additives such as mold releasing agents, coloring agents, surface coupling agents and fire-retarding aids may be incorporated into the composition of this invention.

The epoxy resin composition of this invention may be formed into a molding material by conventional methods. For example, solid components of the composition are pulverized, and then fully mixed in the desired proportions by using a conventional mixing machine such as a mixing roll, a kneader, a ribbon mixer or a ball mill. The mixture can be directly subjected to transfer molding.

The following examples illustrate the present invention more specifically. All parts and percentages in these examples are by weight.

EXAMPLE 1

The following ingredients including an acrylonitrile/butadiene copolymer rubber having an iodine number of 25 (Zetpol 1020, a product of Nippo Zeon Co., Ltd.) as a modifier were kneaded at 70° to 80° C.

for 7 minutes by 10-inch mixing rolls to prepare an epoxy resin molding material.

| | |
|---|---|
| Epoxy resin (epoxy equivalent 220, EOCN 102, a product of Nippon Kayaku Co., Ltd.) | 100 parts |
| Phenol/novolak resin (average molecular weight 800) | 50 parts |
| 2-Undecyl imidazole | 5 parts |
| Carnauba wax | 3 parts |
| Quartz glass powder | 410 parts |
| gamma-Glycidoxypropyl trimethoxysilane | 5 parts |
| Antimony trioxide | 5 parts |
| Decabromodiphenyl ether | 10 parts |
| Carbon black | 3 parts |
| Modifier (Zetpol 1020) | 1–50 parts |

The resulting molding material was molded into an IC sample for evaluating high-temperature bias characteristics, an IC for evaluaing cracking resistance, and an IC sample for evaluating moisture resistance at a temperature of 175° C. and 60 kg/cm² for 2.5 hours. The various properties, such as the bias characteristics, cracking resistance, moisture resistance, volume inherent resistivity, flexural modulus and the glass transition temperature (Tg), of each of these resin-sealed semiconductor devices were measured. The results are shown in Table 1 together with the results of the comparative example.

The testing methods were as follows:

(1) Spiral flow (cm)

Measured at a molding temperature of 175° C. and a molding pressure of 70 kg/cm² using a die conforming substantially to EMMI standards.

(2) Volume inherent resistivity (ohms-cm)

Measured on a test sample (100 mm in diameter) prepared in accordance with JIS K-6911.

(3) Glass transition point Tg (0° C.)

Determined from the flex points of the linear coefficient of expansion in accordance with the measuring method of ASTM D-696.

(4) Flexural modulus (kg/mm²)

A bending test sample (10 mm × 80 mm × 4 mm) was prepared in accordance with JIS K-6911, and its flexural modulus was measured.

(5) High-temperature bias characteristics

An aluminum imitation element was secured to a 16-pin IC frame, and then sealed by transfer molding. A voltage of 30 V was applied to the sealed device, and the high-temperature bias characteristics were examined by the passage of time and the state of occurrence of defects.

(6) Cracking resistance.

Heat-resistant impact strength

Samples of a small-sized thin molded IC device having attached thereto an imitation element molded at 175° C. and 60 kg/cm² for 2.5 minutes were immersed in a fluorine-containing inert liquid (FLUORINERT, a trademark of 3 M) at −65° C. for 5 minutes and then at +155° C. for 5 minutes as one cycle. This thermal shock test was carried out through 1000 cycles, and the number of cracked samples were examined.

Solder-resistant impact strength

Samples of a small-sized thin molded IC device having attached threto an imitation element molded at 175° C. and 60 kg/cm² for 2.5 minutes were caused to absorb moisture by allowing them to stand for 40 hours in a constant-temperature constant-humidity vesssel controlled at 85° C. and 85% RH. Samples were then immersed for 10 seconds in a solder bath at 260° C. or 285° C. The number of cracked samples was examined.

(7) Moisture resistance

An aluminum imitation element was attached to a 16-pin IC frame, and then sealed by transfer molding. The resulting sample was left to stand in steam at 121° C. at 2 atms. The moisture resistance was examined by the passage of time and the state of occurrence of defects due to corrosion of the aluminium.

TABLE 1

| | Run No. | | | | | | | | | |
|---|---|---|---|---|---|---|---|---|---|---|
| | Invention | | | | | Comparison | | | | |
| Test Item | 1 | 2 | 3 | 4 | 5 | 6 | 7 | 8 | 9 | 10 |
| Modifier | Zetpol 1020 | | | | | AY49 −290 (1) | R −45MA (2) | CTBN 1300 × 8 (3) | Hytrel 4056 (4) | — |
| Amount (parts) | 1 | 6 | 10 | 30 | 50 | 25 | 25 | 25 | 25 | — |
| Spiral flow (cm) | 75 | 75 | 73 | 71 | 68 | 65 | 73 | 65 | 30 | 75 |
| Volume inherent resistivity (Ω-cm) Original | $5 \times 10^{16}$ | $5 \times 10^{16}$ | $5 \times 10^{16}$ | $5 \times 10^{16}$ | $5 \times 10^{16}$ | $5 \times 10^{16}$ | $8 \times 10^{15}$ | $3 \times 10^{14}$ | $4 \times 10^{14}$ | $5 \times 10^{16}$ |
| at 150° C. | $7 \times 10^{13}$ | $7 \times 10^{13}$ | $7 \times 10^{13}$ | $7 \times 10^{13}$ | $7 \times 10^{13}$ | $4 \times 10^{13}$ | $9 \times 10^{11}$ | $3 \times 10^{11}$ | $5 \times 10^{11}$ | $7 \times 10^{13}$ |
| After boiling for 24 hours | $6 \times 10^{15}$ | $6 \times 10^{15}$ | $6 \times 10^{15}$ | $6 \times 10^{15}$ | $6 \times 10^{15}$ | $2 \times 10^{15}$ | $5 \times 10^{14}$ | $6 \times 10^{12}$ | $2 \times 10^{13}$ | $6 \times 10^{15}$ |
| Tg (°C.) | 160 | 160 | 158 | 158 | 156 | 152 | 148 | 142 | 150 | 160 |
| Flexural modulus (kg/mm²) | 1100 | 1050 | 1000 | 900 | 800 | 1150 | 850 | 950 | 1050 | 1500 |
| High-temperature bias characteristics (hours) | >1000 | >1000 | >1000 | >1000 | >1000 | 600 | 400 | 300 | 350 | 1000 |
| Cracking resistance (heat-resistant impact strength) (Cracked samples/tested samples) | 0/50 | 0/50 | 0/50 | 0/50 | 0/50 | 5/50 | 0/50 | 0/50 | 0/50 | 50/50 |

TABLE 1-continued

| Test Item | Run No. | | | | | | | | | |
|---|---|---|---|---|---|---|---|---|---|---|
| | Invention | | | | | Comparison | | | | |
| | 1 | 2 | 3 | 4 | 5 | 6 | 7 | 8 | 9 | 10 |
| Moisture resistance (hours) | >1000 | >1000 | >1000 | >1000 | >1000 | 400 | 400 | 250 | 300 | >1000 |

Note
(1) Silicone rubber (AY49-290, a product of Toray Silicone Co., Ltd.)
(2) Carboxyl-terminated cis-1,4-polybutadiene (R-45MA, a product of Idemitsu Petrochemical Co., Ltd.)
(3) Carboxyl-terminated NBR (CTBN 1300 × 8, a product of Ube Industries, Ltd.)
(4) Polyester elastomer (Hytrel 4056, a product of E. I. du Pont de Nemours & Co.)

EXAMPLE 2

Acrylonitrile/butadiene copolymer rubber having a bonded acrylonitrile content of 33.0% and an iodine number of 260 (Nipol 1040, a product of Nippon Zeon Co., Ltd.) was partially hydrogenated in accordance with a customary method to prepare five kinds of hydrogenated NBR samples having an iodine number of 150 to 25.

Separately, a butadiene/butyl acrylate/acrylonitrile (61/5/34, %) terpolymer was prepared by ordinary emulsion polymerization (iodine number 235; abbreviated as NBBR (I)]. The terpolymer was partially hydrogenated to adjust its iodine number to 65 [NBBR (II)].

Example 1 was repeated except that these rubbers were used each in an amount of 25 parts as the modifier. The results are shown in Table 2.

TABLE 2

| Test Item | | Run No. | | | | | | | |
|---|---|---|---|---|---|---|---|---|---|
| | | Invention | | | | | Comparison | | |
| | | 1 | 2 | 3 | 4 | 5 | 6 | 7 | 8 |
| Iodine number of NBR | | 25 | 50 | 65$^{(1)}$ | 100 | 120 | 150 | 235$^{(2)}$ | 260 |
| Volume | Original | $5 \times 10^{16}$ | $5 \times 10^{16}$ | $5 \times 10^{16}$ | $5 \times 10^{16}$ | $5 \times 10^{16}$ | $5 \times 10^{16}$ | $4 \times 10^{15}$ | $7 \times 10^{15}$ |
| inherent | at 150° C. | $7 \times 10^{13}$ | $7 \times 10^{13}$ | $7 \times 10^{13}$ | $7 \times 10^{13}$ | $6.5 \times 10^{13}$ | $5 \times 10^{13}$ | $2 \times 10^{12}$ | $4 \times 10^{12}$ |
| resistivity | After boiling | $6 \times 10^{15}$ | $6 \times 10^{15}$ | $6 \times 10^{15}$ | $6 \times 10^{15}$ | $6 \times 10^{15}$ | $2 \times 10^{15}$ | $3 \times 10^{14}$ | $5 \times 10^{14}$ |
| (Ω-cm) | for 24 hours | | | | | | | | |
| High-temperature bias characteristics (hours) | | >1000 | >1000 | >1000 | >1000 | >1000 | 700 | 540 | 410 |
| Cracking resistance (heat-resistant impact strength) (Cracked samples/tested samples) | | 0/50 | 0/50 | 0/50 | 0/50 | 0/50 | 0/50 | 0/50 | 0/50 |
| Moisture resistance (hours) | | >1000 | >1000 | >1000 | >1000 | >1000 | 1000 | 500 | 350 |

$^{(1)}$NBBR(II)
$^{(2)}$NBBR(I)

EXAMPLE 3

Styrene/butadiene copolymer rubber SBR having a bonded styrene content of 23% (Nipol 1502, a product of Nippon Zeon co., Ltd.; iodine number 210) and polybutadiene rubber BR (Nipol 1240, a product of Nippon Zeon Co., Ltd.; iodine number 410) were each partially hydrogenated in a customary manner to prepare hydrogenated SBR having an iodine number of 50 and hydrogenated BR having an iodine number of 100.

Example 1 was repeated except that these rubbers were used each in an amount of 25 parts as the modifier. The results are shown in Table 3.

TABLE 3

| Test Item | Run No. Invention | |
|---|---|---|
| | 1 | 2 |
| Modifier | Hydrogenated SBR | Hydrogenated BR |
| Iodine value | 50 | 100 |
| Volume Original | $5 \times 10^{16}$ | $5 \times 10^{16}$ |
| inherent At 150° C. | $7 \times 10^{13}$ | $7 \times 10^{13}$ |
| resistivity After boiling | $6 \times 10^{15}$ | $6 \times 10^{15}$ |
| (Ω-cm) for 24 hours | | |
| High-temperature bias characteristics (hours) | >1000 | >1000 |
| Cracking resistance (heat-resistant impact strength) (Cracked samples/tested samples) | 0/50 | 0/50 |
| Moisture resistance (hours) | >1000 | >1000 |

EXAMPLE 4

Example 1 was repeated except that 25 parts each of commercial acrylic rubbers A and B was used as the modifier. The results are shown in Table 4. The rubbers used were as follows:

Acrylic rubber A: Nipol AR32 produced by NIppon Zeon Co., Ltd.
Acrylic rubber B: VAMAC N-123 produced by E. I. du Pont de Nemours & Co.

TABLE 4

| Test Item | Run No. Invention | |
|---|---|---|
| | 1 | 2 |
| Modifier | Acrylic rubber A | Acrylic rubber B |
| Volume Original | $5 \times 10^{16}$ | $5 \times 10^{16}$ |
| inherent at 150° C. | $7 \times 10^{13}$ | $7 \times 10^{13}$ |
| resistivity After boiling | $6 \times 10^{15}$ | $6 \times 10^{15}$ |
| (Ω-cm) for 24 hours | | |
| High-temperature bias characteristics (hours) | >1000 | >1000 |
| Cracking resistance (heat-resistant impact strength) (Cracked samples/tested samples) | 0/50 | 0/50 |
| Moisture resistance (hours) | >1000 | >1000 |

EXAMPLE 5

The following ingredients including liquid NBR having a viscosity of 30,000 cps and an iodine number of 25 were kneaded in accordance with the following compounding recipe by 10-inch mixing rolls at 70° to 80° C. for 7 minutes to prepare an epoxy resin composition

| | |
|---|---|
| Epoxy resin (epoxy equivalent 220, ECCN 102, a product of Nippon Kayaku Co., Ltd.) | 100 parts |
| Phenol novolak resin (average molecular weight 800) | 50 parts |
| 2-Undecyl imidazole | 5 parts |
| Carnauba wax | 3 parts |
| Quartz glass powder | 410 parts |
| gamma-Glycidoxypropyl trimethoxysilane | 5 parts |
| Antimony trioxide | 5 parts |
| Decabromodiphenylether | 10 parts |
| Carbon black | 5 parts |
| Modifier | 1–80 parts |

The resulting composition was molded at 175° C. and 60 kg/cm² for 2.5 minutes into an IC for evaluating high-temperature characteristics, an IC for evaluating cracking resistance, and an IC for evaluating moisture resistance. The various properties, such as the high-temperature bias characteristics, cracking resistance, moisture resistance, volume inherent resistivity, flexural modulus and glass transition temperature (Tg), of each of these resin-sealed semiconductor devices were measured. The results are shown in Table 5 together with the results obtained in the comparative runs.

EXAMPLE 6

Liquid NBR (viscosity 100,000 cps, iodine number 260) having a bonded acrylonitrile content of 33.0 was partially hydrogenated in accordance with a customary method to prepare five kinds of liquid hydrogenated NBR samples having an iodine number of 150 to 25.

Separately, a butadiene/butyl acrylate/acrylonitrile (61/5/34, %) terpolymer was prepared by ordinary emulsion polymerization [viscosity 100,000 cps; iodine number 235; NBBR (III)]. The terpolymer was partially hydrogenated to adjust its iodine number to 65 [designated as NBBR (IV)].

Example 5 was repeated except that these rubbers were used each in an amount of 25 parts as the modifier. The results are shown in Table 6.

TABLE 6

| | Run No. | | | | | | | |
|---|---|---|---|---|---|---|---|---|
| | Invention | | | | | Comparison | | |
| Test Item | 1 | 2 | 3 | 4 | 5 | 6 | 7 | 8 |
| Iodine number of NBR | 25 | 50 | 65(1) | 100 | 120 | 150 | 235(2) | 260 |
| Volume inherent resistivity (Ω-cm) Original | $5 \times 10^{16}$ | $5 \times 10^{16}$ | $5 \times 10^{6}$ | $5 \times 10^{16}$ | $5 \times 10^{16}$ | $5 \times 10^{16}$ | $4 \times 10^{15}$ | $7 \times 10^{15}$ |
| at 150° C. | $7 \times 10^{13}$ | $7 \times 10^{13}$ | $7 \times 10^{3}$ | $7 \times 10^{13}$ | $6.5 \times 10^{13}$ | $5 \times 10^{13}$ | $2 \times 10^{12}$ | $4 \times 10^{12}$ |
| After boiling for 24 hours | $6 \times 10^{15}$ | $6 \times 10^{15}$ | $6 \times 10^{5}$ | $6 \times 10^{15}$ | $6 \times 10^{15}$ | $2 \times 10^{15}$ | $3 \times 10^{14}$ | $5 \times 10^{14}$ |
| High-temperature bias characteristics (hours) | >1000 | >1000 | >1000 | >1000 | >1000 | 760 | 600 | 450 |
| Cracking resistance (heat-resistant impact strength) (Cracked samples/tested samples) | 0/50 | 0/50 | 0/50 | 0/50 | 0/50 | 0/50 | 0/50 | 0/50 |
| Moisture resistance (hours) | >1000 | >1000 | >1000 | >1000 | >1000 | >1000 | 630 | 500 |

(1)NBBR (IV)
(2)NBBR (III)

EXAMPLE 7

Liquid NBR having a bonded acrylonitrile content of 33% was produced in a customary manner, and then partially hydrogenated to give five kinds of liquid hydrogenated NBR having an iodine number of 25 and a viscosity of 5,000 to 1 million cps.

Example 5 was repeated except that these polymers or commercial polymers were each used as the modifier in an amount of 25 parts. The results are shown in Table 7.

TABLE 5

| | | Run No. | | | | | | | | |
|---|---|---|---|---|---|---|---|---|---|---|
| | | Invention | | | | | Comparison | | | |
| Test Item | | 1 | 2 | 3 | 4 | 5 | 6 | 7 | 8 | 9 |
| Amount of the modifier (parts) | | 1 | 6 | 10 | 30 | 50 | — | 0.5 | 60 | 80 |
| Spiral flow (cm) | | 75 | 75 | 73 | 71 | 68 | 75 | 75 | 50 | 20 |
| Volume inherent resistivity (Ω-cm) | Original | $5 \times 10^{16}$ | $5 \times 10^{16}$ | $5 \times 10^{16}$ | $5 \times 10^{16}$ | $5 \times 10^{16}$ | $5 \times 10^{16}$ | $5 \times 10^{16}$ | $5 \times 10^{16}$ | $5 \times 10^{16}$ |
| | at 150° C. | $7 \times 10^{13}$ | $7 \times 10^{13}$ | $7 \times 10^{13}$ | $7 \times 10^{13}$ | $7 \times 10^{13}$ | $7 \times 10^{13}$ | $7 \times 10^{13}$ | $6 \times 10^{13}$ | $4 \times 10^{13}$ |
| | After boiling for 24 hours | $6 \times 10^{15}$ | $6 \times 10^{15}$ | $6 \times 10^{15}$ | $6 \times 10^{15}$ | $6 \times 10^{15}$ | $6 \times 10^{15}$ | $6 \times 10^{15}$ | $8 \times 10^{14}$ | $3 \times 10^{14}$ |
| Tg (°C.) | | 160 | 160 | 158 | 158 | 156 | 160 | 160 | 150 | 135 |
| Flexural modulus (kg/mm²) | | 1100 | 1050 | 1000 | 900 | 900 | 1500 | 1400 | 700 | 600 |
| High-temperature bias characteristics (hours) | | >1000 | >1000 | >1000 | >1000 | >1000 | 1000 | 1000 | >1000 | 1000 |
| Cracking resistance (cracked samples/ tested samples) | Heat-resistant impact strength | 0/50 | 0/50 | 0/50 | 0/50 | 0/50 | 50/50 | 30/50 | 0/50 | 20/50 |
| | Solder-resistant impact strength | 0/25 | 0/25 | 0/25 | 0/25 | 0/25 | 25/25 | 25/25 | 5/25 | 13/25 |
| Moisture resistance (hours) | | >1000 | >1000 | >1000 | >1000 | >1000 | >1000 | >1000 | 800 | 600 |

TABLE 7

| Test Item | | Run No. | | | | | | | | |
|---|---|---|---|---|---|---|---|---|---|---|
| | | Invention | | | | | Comparison | | | |
| | | 1 | 2 | 3 | 4 | 5 | 6 | 7 | 8 | 9 |
| Modifier | | Liquid hydrogenated NBR | | | | | AY49 −290 (1) | R −45MA (2) | CTBN 1300 × 8 (3) | Hytrel 4056 (4) |
| Viscosity (cps) | | 5,000 | 10,000 | 50,000 | 500,000 | 1,000,000 | | | | |
| Spiral flow (cm) | | 75 | 75 | 73 | 71 | 70 | 65 | 73 | 65 | 30 |
| Volume inherent resistivity ($\Omega$-cm) | Original | $5 \times 10^{16}$ | $5 \times 10^{16}$ | $5 \times 10^{16}$ | $5 \times 10^{16}$ | $5 \times 10^{16}$ | $5 \times 10^{16}$ | $8 \times 10^{15}$ | $3 \times 10^{14}$ | $4 \times 10^{14}$ |
| | at 150° C. | $7 \times 10^{13}$ | $7 \times 10^{13}$ | $7 \times 10^{13}$ | $7 \times 10^{13}$ | $7 \times 10^{13}$ | $4 \times 10^{13}$ | $9 \times 10^{11}$ | $3 \times 10^{11}$ | $5 \times 10^{11}$ |
| | After boiling for 24 hours | $6 \times 10^{15}$ | $6 \times 10^{15}$ | $6 \times 10^{15}$ | $6 \times 10^{15}$ | $6 \times 10^{15}$ | $2 \times 10^{15}$ | $5 \times 10^{14}$ | $6 \times 10^{12}$ | $2 \times 10^{13}$ |
| Tg (°C.) | | 160 | 160 | 160 | 160 | 160 | 152 | 148 | 142 | 150 |
| Flexural modulus (kg/mm$^2$) | | 830 | 900 | 960 | 1000 | 1000 | 1150 | 850 | 950 | 1050 |
| High-temperature bias characteristics (kg/mm$^2$) | | >1000 | >1000 | >1000 | >1000 | >1000 | 600 | 400 | 300 | 350 |
| Cracking resistance (cracked samples/ tested samples) | Heat-resistant impact strength | 0/50 | 0/50 | 0/50 | 0/50 | 0/50 | 5/50 | 0/50 | 0/50 | 0/50 |
| | Solder-resistant impact strength | 5/25 | 5/25 | 5/25 | 5/25 | 5/25 | 25/25 | 25/25 | 25/25 | 25/25 |
| Moisture resistance (hours) | | >1000 | >1000 | >1000 | >1000 | >1000 | 400 | 400 | 250 | 300 |

Note
(1), (2), (3) and (4) are same as footnotes in Table 1.

EXAMPLE 8

Example 5 was repeated except that 15 parts of the same liquid NBR [A] as used in Example 5 and 15 parts of a powder of the same partially hydrogenated product of acrylonitrile/butadiene copolymer rubber [B], a powder of hydrogenated acrylic rubber having an iodine number of 25 obtained by partially hydrogenating commercial acrylic rubber (Nipol AR32, a product of Nippon Zeon Co., Ltd.) [C] or a powder of commercial silicone rubber [D] (AY49-290, a product of Toray Silicone Co., Ltd.) were used as the modifier. The results are shown in Table 8.

TABLE 8

| | | Run No. Invention | | | |
|---|---|---|---|---|---|
| Test sample and item | | 1 | 2 | 3 | 4 |
| Modifier (parts) | [A] | 15 | 15 | 15 | 30 |
| | [B] | 15 | — | — | — |
| | [C] | — | 15 | — | — |
| | [D] | — | — | 15 | — |
| Cracking resistance (solder resistant impact strength) (cracked samples/ tested samples) | 260° C. | 0/25 | 0/25 | 0/25 | 0/25 |
| | 285° C. | 0/25 | 0/25 | 0/25 | 0/25 |

EXAMPLE 9

Example 7 was repeated except that each of the polymers indicated in Table 9 was used as the modifier. The results are shown in Table 9.

TABLE 9

| Test Item | | Run No. | | | |
|---|---|---|---|---|---|
| | | 1 | 2 | 3 | 4 |
| | | Invention | | Comparison | |
| Modifier agent | | Hydrogenated product of carboxy-containing liquid NBR (1) | Hydrogenated product of CTBN 1300 × 8 | Carboxy-containing liquid NBR (1) | CTBN 1300 × 8 |
| Viscosity (cps) | | 30,000 | 130,000 | 30,000 | 130,000 |
| Iodine number | | 25 | 25 | 370 | 390 |
| Spiral flow (cm) | | 75 | 70 | 70 | 65 |
| Volume inherent resistivity ($\Omega$-cm) | Original | $5 \times 10^{16}$ | $5 \times 10^{16}$ | $3 \times 10^{14}$ | $3 \times 10^{14}$ |
| | at 150° C. | $7 \times 10^{13}$ | $7 \times 10^{13}$ | $2 \times 10^{11}$ | $3 \times 10^{11}$ |
| | After boiling for 24 hours | $9 \times 10^{15}$ | $8 \times 10^{15}$ | $8 \times 10^{12}$ | $6 \times 10^{12}$ |
| Flexural modulus (kg/mm$^2$) | | 950 | 960 | 950 | 950 |
| High-temperature bias characteristics (hours) | | >1000 | >1000 | 350 | 300 |
| Cracking resistance (cracked samples/ tested samples) | Heat-resistant impact strength | 0/50 | 0/50 | 0/50 | 0/50 |
| | Solder-resistant impact strength | 5/25 | 5/25 | 25/25 | 25/25 |
| Moisture resistance (hours) | | >1000 | >1000 | 300 | 250 |

What is claimed is:

1. A sealed semiconductor device comprising a molded epoxy resin composition for sealing semiconductors said epoxy resin composition comprising an epoxy resin, a curing agent for said epoxy resin, a filler and a modifier, wherein the modifier comprises a diene polymer which is a hydrogenated product of a polymer or copolymer prepared from at least one conjugated diene monomer having an iodine number of not more than 120 in an amount of 1 to 50 parts by weight of modifier per 100 parts by weight of the epoxy resin.

2. The sealed semiconductor device of claim 1 wherein the diene polymer is a rubbery polymer.

3. The sealed semiconductor device of claim 1 wherein the diene polymer is a liquid polymer having a viscosity at 25° C. of 2,000 to 1,000,000.

4. The sealed semiconductor device of claim 1 wherein the diene polymer is selected from the group consisting of an ancrylonitrile/butadiene copolymer, a styrene/butadiene copolymer and polybutadiene.

5. The sealed semiconductor device of claim 1 wherein the filler is an inorganic filler selected from the group consisting of calcium carbonate, silica powder, zirconium silicate, calcium silicate, quartz glass powder, talc, clay, mica and glass fiber powders or mixtures thereof.

* * * * *